April 5, 1960 W. O. GORDON 2,931,220
DEFLECTION MEASURING APPARATUS
Filed Oct. 21, 1957
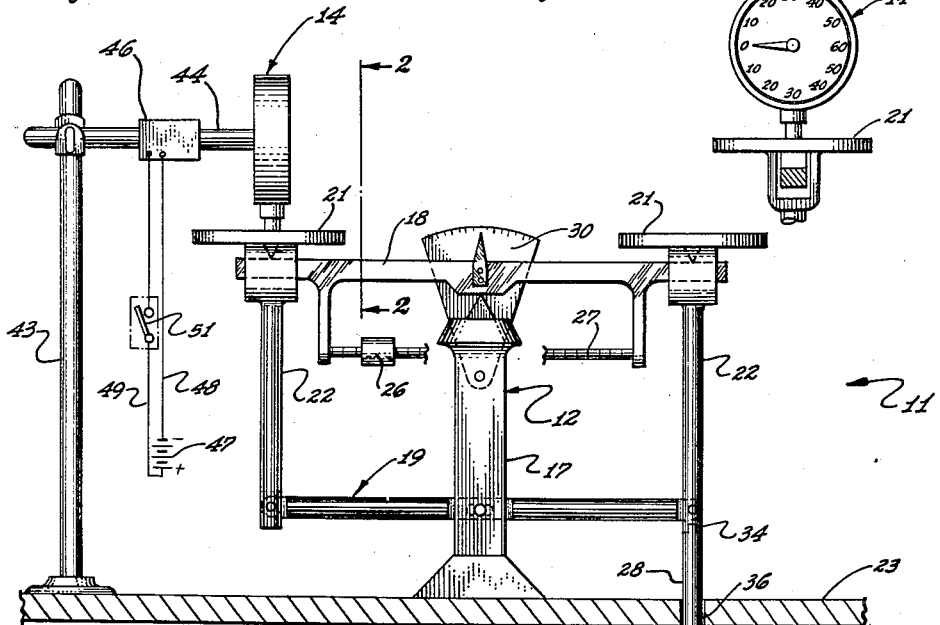
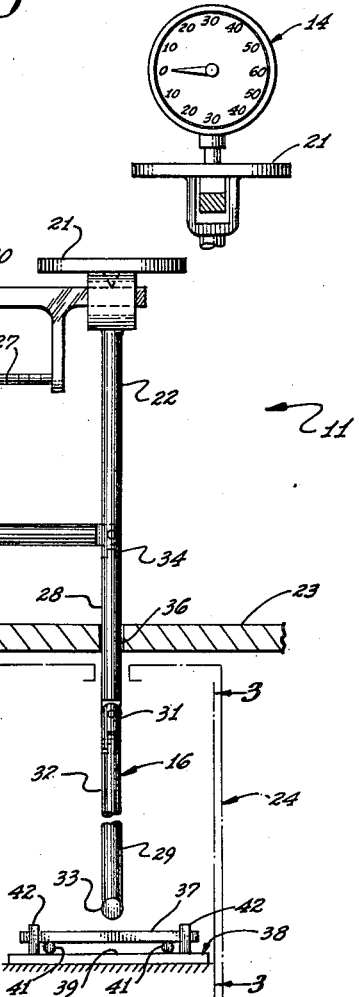
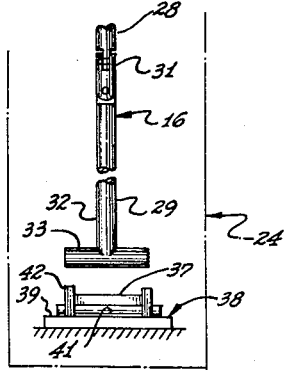
INVENTOR:
Willis O. Gordon
His Patent Attorney,

United States Patent Office 2,931,220
Patented Apr. 5, 1960

2,931,220

DEFLECTION MEASURING APPARATUS

Willis O. Gordon, Los Angeles, Calif., assignor to Northrop Corporation, Hawthorne, Calif., a corporation of California Application October 21, 1957, Serial No. 691,448

4 Claims. (Cl. 73—88)

This invention relates to test apparatus and more particularly to a test facility having utility in obtaining data from which the section modulus of elastomer test specimen and the like may be calculated.

Elastomer type materials, when fabricated into components which in turn are utilized in aircraft construction or the like, may be periodically or continuously subjected to abnormal and especially subzero temperatures. For obvious reasons it is essential to predetermine the serviceability characteristics of elastomer material under the aforementioned subzero temperatures. This is accomplished by subjecting test specimen to conditions identical with conditions under which the actual elastomer components are expected to function.

Normally a complete serviceability analysis, especially of an elastomer-like material, includes the determination of both its bending and brittleness characteristics, however, the present disclosure relates only to apparatus for obtaining data from which the section or Young's modulus of the subject test specimen may be calculated.

Various types of apparatus are presently known for obtaining data from which Young's modulus may be calculated. However, the apparatus as disclosed herein is considered novel with respect to known apparatus now available due to its novel features and its simple and straightforward construction which will become obvious as the disclosure progresses.

An object of the present invention is to provide a test facility usable in determining the section modulus of test specimen which may be calculated and in which major portions of the facility constitute standard laboratory apparatus and equipment.

Another object is to provide a test facility usable in measuring the deflection of test specimen and which embodies a novel feature causing the deflection measuring means to provide identical and constant readings under subsequent identical conditions.

Another object is to provide a test facility usable in measuring the deflection of test specimen and which embodies a novel feature insuring that the force deflecting a test specimen will be applied in a true normal direction on the upper surface of the specimen.

Another object is to provide a test facility usable in determining the section modulus of test specimen which is simple in design, economical to construct, and which is particularly free of malfunctioning tendencies.

Although the characteristic features of the present invention are particularly pointed out in the appended claims, the invention itself, also the manner in which it may be carried out, will be better understood by referring to the following description taken in connection with the accompanying drawing forming a part of this application and in which:

Figure 1 is a front elevational view of the test facility as disclosed herein.

Figures 2 and 3 are views of the test facility as indicated by the arrows 2—2 and 3—3, respectively, in Figure 1.

Referring now to the drawing a test facility 11 of the type disclosed herein is shown in Figure 1. The major components of the facility 11 includes a balance 12, a dial gauge 14, and a force transmitting assembly 16.

The balance 12 constitutes a standard type platform balance which is slightly modified and which has a load capacity of approximately 200 grams. Although the balance itself is of conventional design and construction the individual parts thereof will be identified in order that they may be more easily referred to as the disclosure progresses. The balance includes a base and support assembly 17, a balancing beam 18, a stabilizing linkage 19, right and left hand platforms 21—21, and right and left hand balance pan stirrups 22—22. As seen in Figure 1 the assembly 17 of the balance rests on a horizontal surface 23, the latter may constitute the upper wall of a cold cabinet 24 shown in phantom construction in Figure 1. Loads are applied to the balance 11 by shifting a weight 26 which is positioned on the rider arm 27. The state of equipoise of the balance 12 is indicated by the balance indicating means 30.

The force transmitting assembly 16 consists of an upper portion 28 and a lower portion 29 joined together by a universal type joint 31. The portion 28 consists of a single cylindrical rod while the portion 29 consists of a pair of cylindrical rods 32 and 33 joined together in fixed relation. As joined together the axes of the rods 32 and 33 are normal to each other with respect to a common plane containing their respective axes and also in a plane extending in a direction normal to the above mentioned common plane. So joined the rods 32 and 33 define a foot portion of T-shaped configuration and will be referred to as such hereinafter.

The free end of the portion 28 is rigidly attached to the right hand stirrup 22 as indicated by the numeral 34. As attached the rod 28 is in a vertical position and remains so throughout the operating range of the balance 11. It will also be apparent that under normal conditions the portion 29 depends vertically below the portion 28 with the axes of the portion 28 and 32 in coincidence. As assembled it will also be seen that the assembly 16 depends through an aperture 36 formed in the platform or wall 23 and extends into the cold cabinet 24.

The specimen 37, the serviceability characteristics of which are to be determined, is supported on a saddle 38 which in turn is positioned within the cabinet 24. The saddle 38 is of conventional construction, briefly it consists of a plate 39, a pair of stainless steel rods 41–41 and four guide pins 42 adapted to contain the specimen on the rods 41–41. It is to be understood that the plate 39 and accordingly the specimen 37 is positioned in a true horizontal attitude by leveling screws (not shown).

Contacting the upper surface of the left hand platform of the balance 11 is the pressure foot of the aforementioned dial guage 14. The dial guage, which is quite sensitive and is graduated to read in thousandths of an inch, is supported in the position just described and as shown in Figures 1 and 2 by a laboratory standard 43 and supporting rod 44. An interrupting type vibrator 46 of the kind used in door bells and like devices, having a variable intensity and an adjustable frequency, is secured to the rod 44 by a laboratory clamp or the like (not shown). The vibrator 46 is powered by a power source 47 through connectors 48 and 49 and is energized at such times as the switch 51 is closed.

The vibrator 46 when actuated is very effective in obtaining constant and duplicate readings on the dial guage 14. The vibrator imparts vibrations to the dial guage 14, through the balance 12, and to the specimen 37 under test. The vibrator functions to eliminate lag (static friction) which otherwise would be present in the system or assembly 11. For example, without the vibrator 46 activated it is impossible to obtain concordant dial readings regardless of how carefully the load is applied to the specimen or after removal of the load therefrom. With the vibrator in operation concordant and duplicate readings may be made.

The operation of the facility 11, also the procedure to be followed in measuring the deflections of a test specimen 37, is quite similar to the operation and procedures followed in connection with known apparatus and therefore are well known by those skilled in the art. Briefly the deflection of a test specimen is determined as follows: a test specimen, for example the test specimen 37, is positioned on the supporting rods 41—41 in the cold cabinet 24, at a position directly below the force-transmitting assembly 16, as best seen in Figures 1 and 3. When the temperature of the specimen 16 has been lowered sufficiently, the assembly 16 is caused to contact the upper surface of the specimen. This may be accomplished by moving the weight 26 to the right (Figure 1) or by placing sufficient weights on the right-hand platform 21. Further movement of the weight 26 to the right results in deflection of the test specimen 37. These deflections are measured by means of the dial indicator 14 which measurement is utilized to determine the section modulus and other characteristics of the test specimen 37. Repeated operations as described above result in identical and constant readings due to novel features incorporated in the test facility 11.

The novel features referred to above insure an ease of operation not found in comparable apparatus and also insure extremely accurate results. For example, the universal type joint 31 insures that the axis of the rod 32 will be in a true vertical attitude throughout the operation of the balance 12. Accordingly as an unbalanced condition is imposed on the balance 12, thereby forcing the right hand balance down and causing the rod 33 to contact the upper surface of the specimen 37, the rod 33 will contact the upper surface of the specimen 37 in a full parallel relationship. Thus the force or load transmitted by the member 16 will be distributed equally on the specimen 37 in a crosswise direction. This true relationship as just described will prevail at all times as the deflections of the specimen 37 is being measured.

Also concordant and duplicated readings of the gauge 14 are forthcoming as a result of the vibrator 46 being actuated for reasons as previously discussed. In securing various deflection measurements of the specimen 37 which are subsequently used in the calculation of Young's modulus of the specimen, it is customary to take duplicate readings corresponding to duplicate or previous deflections of the specimen 37. If it was not for the vibrator 46 these readings in all probability would not agree due to inherent lag in the facility 11. The vibrator then removes the effect of lag inherently present in the facility 11, and which is also present in like devices, and therefore insures true or concordant readings according to whether the specimen is subject to initial or duplicate deflections.

While only one saddle 38 containing a single specimen 37 is shown in the drawing it is apparent that a plurality of such specimen may be positioned in the cabinet 24 and tested during a single operation. For example, a plurality of saddles may be positioned on a rotary platform (not shown) and when the platform is rotated the specimen carried by respective saddles will automatically be positioned under the force transmitting member 16.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed:

1. In a deflection measuring facility, the combination comprising: a laboratory-type balance including a base and support assembly; a pair of weight receiving platforms, and balance indicating means; a dial type gauge including a pressure foot, a pointer and a scale, the latter two elements cooperating to indicate linear displacement of said foot from a zero position; said gauge being adjustably mounted on said base and support assembly in a position above one of said platforms with the foot thereof in contact with said one platform, and an elongated force transmitting member attached to and depending from the other platform of said pair of platforms.

2. In deflection measuring apparatus as set forth in claim 1 further characterized by a vibrator attached to said gauge and which may be actuated as desired.

3. In deflection measuring apparatus as set forth in claim 1 further characterized in that said elongated member constitutes an inverted T-shaped rod member the upper end of which is rigidly attached to the other platform of said pair of platforms.

4. In deflection measuring apparatus as set forth in claim 3 further characterized in that said rod member includes an upper end, a lower end and a universal joint joining said upper and lower end portions.

References Cited in the file of this patent

UNITED STATES PATENTS

| | | |
|---|---|---|
| 210,252 | Grout | Nov. 26, 1878 |
| 213,362 | Usher | Mar. 18, 1879 |
| 340,842 | West | Apr. 27, 1886 |
| 819,584 | Olsen | May 1, 1906 |
| 1,573,865 | Robbins | Feb. 23, 1926 |
| 1,798,538 | Karrer | Mar. 31, 1931 |
| 2,152,556 | Messinger | Mar. 28, 1939 |
| 2,419,217 | Isenberg | Apr. 22, 1947 |
| 2,670,624 | Farris, Jr. et al. | Mar. 2, 1954 |